Patented Feb. 16, 1926.

1,573,509

UNITED STATES PATENT OFFICE.

ERNEST BATEMAN, OF MADISON, WISCONSIN, ASSIGNOR TO THE UNITED STATES OF AMERICA.

PROCESS OF PRODUCING HIGHLY-ADSORBENT CHARCOAL.

No Drawing.   Application filed August 5, 1919. Serial No. 315,498.

*To all whom it may concern:*

Be it known that ERNEST BATEMAN, a citizen of the United States, residing at Madison, in the county of Dane and State of Wisconsin, has invented certain new and useful Improvements in Processes of Producing Highly-Adsorbent Charcoal, of which the following is a specification.

This invention relates to the production of a carbon having great power for the adsorption of gases.

One object of the invention is directed to the production of an adsorptive carbon particularly effective for adsorbing poisonous gases. Another object of the invention pertains to the manufacturing of a carbon which may have great power for decolorizing and clarifying solutions, such as sugar solutions.

The raw carbonaceous material used in this process may be wood charcoal, nut shell or fruit pit charcoal, anthracite coal, or any other material which is chiefly carbon and which contains relatively small amounts of volatile matter. In conducting the process the following features are considered as important. The process must be conducted within a closed container and in the presence of carbon dioxide gas; the material must be in small pieces in order to expose a relatively large surface upon which the gas may react; the temperature must be sufficiently high to allow the action to take place within a reasonable time, this temperature preferably being between 650° C. and 1000° C.; and, finally, the gas must have opportunity to come into contact with all parts of the material to be treated, and to this end the gas is either circulated or the material is agitated while in contact with the gas.

The process of activating the material may be carried out in accordance with the following details. Air dried charcoal, carbon, is ground and screened through a screen which should have no less than four nor more than twenty meshes per linear inch. The coal is then placed in a heated chamber, which may be either rotary or stationary, and may then be fed and discharged either continuously or periodically. The shape, the form, and the manner of heating is immaterial. This may, however, be accomplished in a rotary furnace so arranged that the particles of carbon are dropped through an atmosphere of heated carbon dioxide, or may be done in a vertical furnace where the gas passes through the charcoal while held in a vertical position. Or the process may be accomplished by the use of an oven containing shallow trays or pans holding the charcoal and carbon to be treated. In this latter instance it is desirable that the atmosphere of carbon dioxide in the oven be maintained in continuous motion. The essential condition in any manner of treatment is that the charcoal or carbon be heated to a temperature of not less than 650° C. nor more than 1000° C. and should be brought into immediate contact with carbon dioxide gas. The reason for setting the limits for temperature as between 650° C. and 1000° C. will be apparent in view of the following conditions surrounding the treatment of the charcoal. The carbon dioxide gas reacts with the charcoal yielding carbon monoxide. The reaction may be considered as taking place in two phases. In the first, the penetration of the gas into the coal proceeds with the formation of minute checks or cracks and may be termed internal combustion. In the second phase the surface of the coal is burned. The first phase reduces the weight of the coal, but not the volume, but the second phase reduces both the weight and volume. It has been found that the most economical temperature is between 650° C. and 1000° C., for instance, at 800° C. the speed of the first phase mentioned is such that a charcoal of a high adsorption power can be produced in a reasonable time, while the speed of the second phase is such that the losses by volume are reduced to a minimum. Below 650° C. the speed of both phases in reaction is too slow to be of commercial importance, but above 1000° the reduction in weight and volume is so rapid as to be wasteful and productive of poor yields of actively adsorbent material.

The use of carbon dioxide gas in the treatment of charcoal is of advantage over that of steam in that lower temperatures may be used to accomplish results with an increase in yields of active material and reduction in loss from wear of the furnaces.

What I claim is:

1. In a process of activating carbon, treating carbon in comminuted form and while in a free condition with carbon dioxide at temperatures of 650–1000° C.

2. In a process of activating carbon, dropping comminuted particles of carbon through carbon dioxide at temperatures of 650–1000° C.

3. In a process of activating carbon, heating comminuted particles of carbon at 650–1000° C, while falling through an atmosphere of carbon dioxide gas.

In testimony whereof I affix my signature.

ERNEST BATEMAN.